United States Patent Office 3,544,172
Patented Dec. 1, 1970

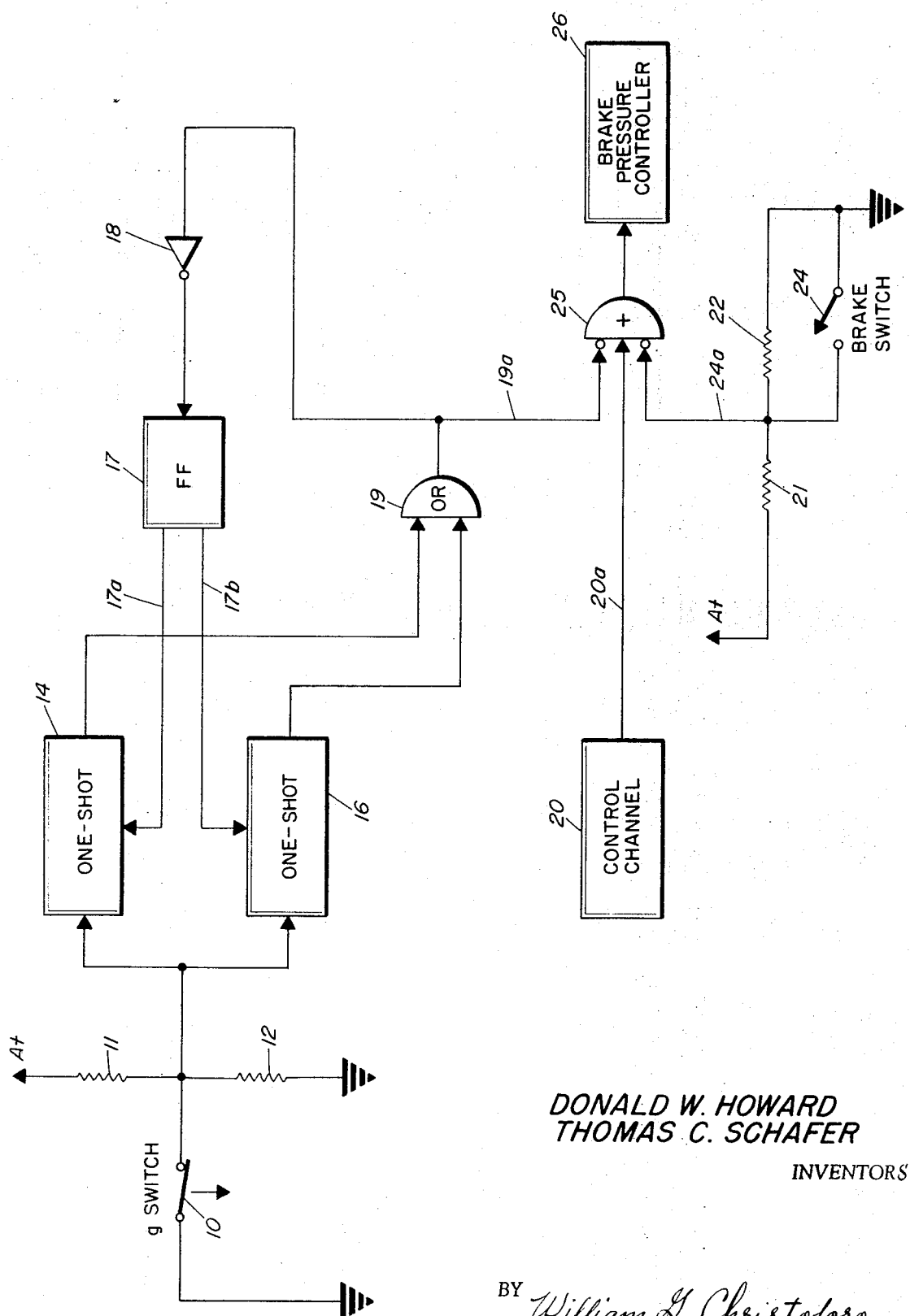

3,544,172
ADAPTIVE BRAKING SYSTEM FALSE TRIGGER HOLD-OFF CIRCUIT
Donald W. Howard and Thomas C. Schafer, South Bend, Ind., assignors to The Bendix Corporation, a corporation of Delaware
Filed Dec. 16, 1968, Ser. No. 783,813
Int. Cl. B60t 8/08
U.S. Cl. 303—21      8 Claims

ABSTRACT OF THE DISCLOSURE

An improved control channel for an automobile adaptive braking system wherein control signals which are generated after a controlled wheel decelerates to a predetermined reference are applied to a braking pressure controller to automatically control the braking pressure applied to the controlled wheel so as to optimize wheel braking characteristics. An acceleration switch senses wheel or axle vertical acceleration forces and in response thereto causes one or the other of a pair of one-shots to generate an output pulse which inhibits a gate through which the control channel control signal must pass on its way to the brake pressure controller, thus preventing vertical acceleration forces (false triggers) from activating the brake pressure controller.

CROSS REFERENCES TO RELATED APPLICATIONS

The false trigger hold-off circuit disclosed herein is an improvement for automobile, truck and the like adaptive braking systems of the type disclosed in a patent application for "Automobile Anti-Skid Control System," by M. Slavin et al., application Ser. No. 712,672 filed Mar. 13, 1968 and which is assigned to the assignee in the present application. The prior application is specifically referred to below and hereby incorporated by reference.

BACKGROUND OF THE INVENTION

This invention relates to improvements in automobile braking systems and more particularly to improvements in adaptive braking systems which initiate a control signal in response to an initial wheel deceleration signal or other suitable wheel signal.

There was described in the aforementioned patent application Ser. No. 712,672 an adaptive braking system control channel which includes a sensor mounted on a vehicle wheel which generates pulses at a rate proportional to wheel rotational speed. These pulses are accumulated in a counter so as to generate a D.C. voltage level proportional to wheel rotational speed, with this latter signal being differentiated to provide an electrical signal proportional to wheel acceleration and deceleration. The deceleration signal is compared in a comparator against a reference deceleration level so as to generate an error signal whenever the wheel deceleration attains the reference deceleration. The error signal activates a memory which memorizes the instantaneous wheel speed over a predetermined short time period. If during this time period wheel speed drops by a predetermined percentage a control signal is allowed to pass through a gate qualified by a signal from the vehicle brake switch, to a brake pressure controller, which in response thereto acts to attenuate the braking pressure at the controlled wheel. When braking on a rough surface, however, such as at a railroad crossing, at a deceleration level below the threshold of adaptive braking action, the braking pressure controller can be activated even though brake pressure is relatively low. This is caused as follows. When the wheels bounce in a vertical plane, often leaving the road surface, the frictional coefficient which tends to keep the braked wheel rotating when the wheel is in contact with the road surface now drops to zero or a very low value and wheel speed rapidly decreases, thus possibly providing the necessary elements for triggering the brake control system. In order to allow the brake control system to distinguish between such a false alarm and a proper initiating signal, it is neecssary to provide an inhibit or hold-off signal of a predetermined time period if the initiating signal is caused by forces which tend to urge the wheel from the road surface, in other words, vertical acceleration forces.

SUMMARY OF THE INVENTION

Accordingly, an improvement to known adaptive braking systems has been devised comprising a false trigger hold-off circuit. An acceleration switch which will open in response to acceleration forces applied along its active axis is mounted in the vehicle with its active axis vertical, suitably on the wheel or vehicle axle whose braking characteristics are to be controlled by the control channel. The acceleration switch is thus sensitive to vertical acceleration impulses such as would be caused by the wheel passing over railroad crossings, chuck holes or other road imperfections. Opening of the acceleration switch causes one or the other of a pair of one-shots, only one of which is energized, to generate an output pulse which is applied to inhibit an AND gate through which the control channel control signal must pass on its way to a brake pressure controller. The one-shot output pulse is also used to toggle a flip-flop which in turn deenergizes the one-shot and energizes the other one-shot. The use of the dual one-shots, only one of which is energized at a time, eliminates the dead spot occuring during the one-shot reset time. This allows the system to provide a continuous hold-off capability if the vertical acceleration pulses appear on a repetitive basis at a rapid rate. An object of the present invention is thus to provide a means for preventing false triggers from affecting the operation of an adaptive braking control channel.

Another object of this invention is to provide a means of the type described which is compatible with known existing adaptive braking systems.

hTese and othe robjects of this invention will become apparent to one skilled in the art upon a reading and understanding of the following disclosure.

BRIEF DESCRIPTION OF THE DRAWINGS

The figure is a block diagram of the invention.

DESCRIPTION OF THE PREFERRED EMBODIMENT

Referring to the figure, there is seen an adaptive braking control channel 20 and the elements of the invention as they would be installed on an automobile, truck, or the like. As long as brake switch 24, which is ganged to the vehicle brake pedal, is open, that is when the brake pedal is not depressed, gate 25 is inhibited by an A+ voltage acting through the voltage divider comprised of resistors 21 and 22. Thus, during this time any control channel 20 control signals which might be generated along line 20a are blocked from passing through to the brake pressure controller 26. If now, the brake pedal is depressed so that switch 24 closes, the gate 25 inhibiting signal on line 24a is extinguished. If at the same time there is no gate 25 inhibiting signal on line 19a, such as would be the case as long as acceleration switch 10 remains closed, in a manner to be described below, control signals generated by control channel 20 will pass along line 20a and through gate 25 to the brake pressure controller 26 to thus initiate control of the braking pressure on the wheel or wheels controlled by control channel 20. As has been previously explained for certain known types of control channel the output control signal is generated only after wheel rotational deceleration exceeds a predetermined reference deceleration level. For other known types of control channel, such as that described in the aforementioned patent application Ser. No. 712,672 the control signal is generated only after the controlled wheel attains the reference deceleration level and additionally thereafter drops in speed by a predetermined percentage within a predetermined time period. As long as the controlled wheel remains in contact with the road surface these conditions for the generation of the control signal will be attained only when locking of the controlled wheel becomes imminent. If, during a braked stop, where the combination of braking pressure and tire to road surface conditions are such that the conditions necessary to cause control channel 20 to generate a control signal are not present, the wheel is suddenly forced to leave the road surface such as by striking a chuck hole, the sudden release of tire to road surface friction will cause the wheel to rapidly and abnormally decelerate thus possibly triggering control channel 20 to generate the control signal. If this control signal could now pass directly into the brake pressure controller 26 the braking pressure of the wheel would be released so that upon the wheel subsequently coming into contact with the road surface the braking capacity of the wheel would be greatly diminished. It is thus necessary that the force which impelled the wheel to leave the road surface must also cause a gate inhibiting signal to appear on line 19a to thus prevent the control channel control signals from reaching the brake pressure controller 26 under these conditions. This is accomplished as follows. A nomally closed acceleration switch 10, having an active axis, that is an axis along which acceelration forces must be applied to cause the switch to open, is mounted on the vehicle wheel or axle with its active axis vertical. The dual one-shots 14 and 16 have their trigger inputs normally grounded through switch 10. It will be further not that the one-shots 14 and 16 receive power and are energized by the flip-flop 17 output set and reset lines 17a and 17b, respectively, so that only one of the one-shots may be energized at a time depending on whether the flip-flop is in the set or reset state. Assuming now that flip-flop 17 is initially in the set state so that output line 17a and hence one-shot 14 are energized and that during a braked stop the wheel on which acceleration switch 10 is mounted hits a chuck hole with such force that switch 10 opens. One-shot 14 will thus be triggered by the A+ voltage acting through the voltage divider comprised of resistors 11 and 12. The oneshot output pulse is applied through OR gate 19 and along line 19a to an inhibiting terminal of gate 25, thus preventing any control signals which might be generated on line 20a from reaching brake pressure controller 26. It will be remembered that in describing the control channel it was mentioned that one type of control channel generates a control signal only after the wheel deceleration has exceeded a predetermined deceleration reference level and the wheel speed then decreases by a predetermined percentage within a predetermined time period. Where this type of control channel is used it is necessary that the period of the one-shot be at least equal to the predetermined time period during which the control channel can be activated. At the completion of the one-shot output pulse the voltage transition is inverted by inverter 18 to trigger flip-flop 17 into, for this example, the reset state so that flip-flop reest output line 17b and one-shot 16 are now energized. It is thus possible to continuously hold gate 25 inhibited if the input pulses applied to acceleration switch 10 occur at a repetitive basis at a fairly rapid rate.

While we have taught what we have considered to be the preferred embodiment of our invention, it is obvious that certain changes and modifications can be made by one skilled in the art without departing from our invention. We therefore claim as our invention all such changes and modifications which fall within the true scope and spirit of the appended claims.

The invention claimed is:

1. In a wheeled vehicle having a wheel braking system whereby said vehicle wheels are braked by a braking force to decelerate said wheels and including an adaptive braking control channel for generating a control signal and a brake pressure controller responsive to said control signal for controlling said braking force on at least one of said wheels, said control channel being triggered by an electrical signal proportional to rotational deceleration of one of said controlled wheels, an improvement to said control channel to prevent false triggering of said control channel comprising:
   accelerometer means responsive to vertical acceleration forces on at least one of said controlled wheels for generating an inhibiting signal; and,
   means responsive to said inhibiting signal for inhibiting said control signal.

2. An improvement to said control channel as recited in claim 1 wherein said acceleration means comprises:
   an accelerometer responsive to vertical acceleration forces on at least one of said controlled wheels for generating a vertical acceleration signal;
   timed means triggered by said vertical acceleration signal for generating an output pulse having a predetermined time period, said output pulse comprising said inhibiting signal.

3. An improvement to said control channel as recited in claim 2 wherein said inhibiting means comprises a gate means for connecting said control signal to said brake pressure controller, said gate means being closed by said inhibiting signal.

4. An improvement to said control channel as recited in claim 3 wherein said timed means comprises a one-shot triggered by said vertical acceleration signal for generating a one-shot output pulse, said one-shot output pulse comprising said inhibiting signal.

5. An improvement to said control channel as recited in claim 2 wherein said timed means comprises:
   first means triggered by said vertical acceleration signal when energized for generating a first output pulse;
   second means triggered by said vertical acceleration signal when energized for generating a second output pulse;
   means responsive to said first output pulse for energizing said second means and responsive to said second output pulse for energizing said first means; and, wherein said first and second output pulses comprise said inhibiting signal.

6. An improvement to said control channel as recited in claim 5 wherein said energizing means comprises:
   gating means for passing both said first and second output pulses, said passed pulses comprising said inhibiting signal; and,
   bistable means triggered by said inhibiting signal for alternately energizing said first and second means.

7. An improvement to said control channel as recited in claim 6 wherein said first and second means comprised first and second one-shots respectively.

8. An improvement to said control channel as recited in claim 6 wherein said bistable means comprises:
- a bistable element for alternately energizing said first and second means; and,
- means responsive to the trailing edge of said inhibiting signal for triggering said bistable element.

References Cited

UNITED STATES PATENTS 3,362,757   1/1968   Marcheron _____ 303—21(A4)
3,401,984   9/1968   Williams et al. __ 303—21(A4)

DUANE A. REGER, Primary Examiner

U.S. Cl. X.R.

303—20